(12) United States Patent
Watamura et al.

(10) Patent No.: US 11,054,864 B1
(45) Date of Patent: Jul. 6, 2021

(54) PORTABLE INFORMATION DEVICE AND STAND DEVICE

(71) Applicant: LENOVO (SINGAPORE) PTE. LTD., Singapore (SG)

(72) Inventors: Kenji Watamura, Yokohama (JP); Kazuo Fujii, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/886,689

(22) Filed: May 28, 2020

(30) Foreign Application Priority Data

Feb. 20, 2020 (JP) .............................. JP2020-027432

(51) Int. Cl.
*G06F 1/16* (2006.01)
(52) U.S. Cl.
CPC ............ *G06F 1/166* (2013.01); *G06F 1/1626* (2013.01); *G06F 1/1681* (2013.01)
(58) Field of Classification Search
CPC combination set(s) only.
See application file for complete search history.

(56) References Cited

U.S. PATENT DOCUMENTS

| | | | | |
|---|---|---|---|---|
| 8,014,147 B2* | 9/2011 | Chen | ....................... | G06F 1/183 361/679.56 |
| 8,359,078 B2* | 1/2013 | Hung | ...................... | H04M 1/04 455/575.8 |
| 8,717,319 B2* | 5/2014 | Wu | ........................ | G06F 1/1632 345/173 |
| 8,731,626 B2* | 5/2014 | Hung | ...................... | B65D 25/00 455/575.8 |
| 8,915,357 B2* | 12/2014 | Mecchella | .............. | A45C 11/00 206/45.23 |
| 9,013,863 B2* | 4/2015 | Hsu | ........................ | G06F 1/1654 361/679.01 |
| 9,618,976 B2* | 4/2017 | Truong | ................... | H04N 5/655 |
| 9,654,608 B2* | 5/2017 | Wallace | ................... | G06F 1/166 |
| 9,851,757 B2* | 12/2017 | Tsuchihashi | ........... | G06F 1/1671 |
| 9,904,315 B2* | 2/2018 | Zhang | .................... | G06F 1/1618 |
| 9,990,007 B2* | 6/2018 | Nakagaki | ................. | G06F 1/166 |
| D824,898 S * | 8/2018 | Xu | ................................ | D14/341 |
| 10,159,319 B2* | 12/2018 | Sirichai | ................ | H05K 5/0234 |
| 10,558,244 B1* | 2/2020 | Brocklesby | ........... | H02G 11/003 |
| 10,585,451 B1* | 3/2020 | Brocklesby | ............ | G06F 1/1637 |

(Continued)

FOREIGN PATENT DOCUMENTS

JP 2018105961 A 7/2018

*Primary Examiner* — Lisa Lea-Edmonds
(74) *Attorney, Agent, or Firm* — Shimokaji IP

(57) ABSTRACT

A portable information device includes a first chassis, a second chassis adjacent to the first chassis and connected so as to be pivotable relative to the first chassis, and a stand device. The stand device includes a first and a second stand plate, which are provided on back faces of the first and the second chassis and movable between a housing position along the back face and an upright position in which the first and second stand plates protrudes from the back faces. The first stand plate and the second stand plate are switchable between a separated state, in which their adjacent ends are spaced apart from each other so as to be configured separately, and a connected state, in which their adjacent ends are connected to each other so as to move together between the housing position and the upright position.

9 Claims, 13 Drawing Sheets

(56) References Cited

U.S. PATENT DOCUMENTS

| | | | |
|---|---|---|---|
| 10,606,319 B1* | 3/2020 | Brocklesby | G06F 1/203 |
| 10,635,132 B1* | 4/2020 | Brocklesby | G06F 1/1683 |
| 2012/0218699 A1* | 8/2012 | Leung | G06F 1/1681 |
| | | | 361/679.08 |
| 2013/0069878 A1* | 3/2013 | Li | G06F 1/1616 |
| | | | 345/168 |
| 2013/0214661 A1* | 8/2013 | McBroom | G06F 1/162 |
| | | | 312/325 |
| 2013/0322003 A1* | 12/2013 | Nakada | G06F 1/166 |
| | | | 361/679.26 |
| 2015/0346777 A1* | 12/2015 | Hosoya | F16M 13/00 |
| | | | 361/679.56 |
| 2016/0026218 A1* | 1/2016 | Jefferies | A45C 11/00 |
| | | | 455/575.8 |
| 2016/0041588 A1* | 2/2016 | Grimme | G06F 1/1656 |
| | | | 361/679.13 |
| 2018/0239399 A1* | 8/2018 | Nakada | G06F 1/1681 |
| 2018/0329453 A1* | 11/2018 | Elias | G06F 1/1679 |
| 2020/0249726 A1* | 8/2020 | Brocklesby | G06F 1/1683 |

* cited by examiner

PORTABLE INFORMATION DEVICE AND STAND DEVICE

FIELD OF THE INVENTION

The present invention relates to a portable information device and a stand device.

BACKGROUND OF THE INVENTION

There are portable information devices such as a tablet PC, a smartphone, and the like having a touch-panel liquid crystal display without a physical keyboard. It is desirable that the display of this type of portable information device is large when used, but the display is also required to be downsized when carried. Therefore, the present applicant has proposed a portable information device in which the right and left chasses are pivotably connected to each other so as to enable a formation of a large outer surface spanning the right and left chasses when used (for example, refer to Japanese Unexamined Patent Application Publication No. 2018-105961).

SUMMARY OF THE INVENTION

The portable information device as described above is in some cases operated with being held by hand or in other cases operated with being placed on a desk or the like. In the case where the portable information device is operated with being placed on a desk or the like, convenience increases if it can stand with a stand. Therefore, the configuration in Japanese Unexamined Patent Application Publication No. 2018-105961 described above increases convenience with a stand function provided to a cover that covers a back face of the portable information device.

Meanwhile, in the portable information device as described above, a circumferential difference in outer surface occurs between the closed state and the open state of the right and left chassis. Therefore, the configuration in Japanese Unexamined Patent Application Publication No. 2018-105961 described above absorbs the circumferential difference by providing a large number of folding lines in the center of the stand plate across the back faces of the right and left chasses. As a result, in the configuration of Japanese Unexamined Patent Application Publication No. 2018-105961, the structure of the stand is complicated.

The present invention has been made in view of the above problem of the conventional technique. Therefore, it is an object of the present invention to provide a portable information device and a stand device capable of providing both of high convenience and a simple configuration.

A portable information device according to the first aspect of the present invention includes: a first chassis; a second chassis that is adjacent to the first chassis and is connected so as to be pivotable relative to the first chassis; and a stand device, wherein the stand device includes: a first stand plate provided on a back face of the first chassis and movable to a housing position along the back face and to an upright position in which the first stand plate protrudes from the back face; and a second stand plate provided on the back face of the second chassis and movable to a housing position along the back face and to an upright position in which the second stand plate protrudes from the back face and wherein the first and second stand plates are switchable between a separated state, in which the first and second stand plates are configured separately with their adjacent ends spaced apart from each other, and a connected state, in which the adjacent ends are connected to each other so as to move together between the housing position and the upright position.

The portable information device may be configured in such a way that the first chassis and the second chassis are able to be changed into a flat-plate form, in which their front faces are arranged side by side in an in-plane direction, and into a stacked form, in which the first chassis and the second chassis are stacked so that their front or back faces face each other, and that the stand device is placed in the connected state with the adjacent ends coming into contact with each other in the flat-plate form and is placed in the separated state with the adjacent ends spaced apart from each other in the stacked form.

The portable information device may be configured in such a way that the stand device includes: a first hinge part that supports a first end of the first stand plate so as to be rotatable with respect to the first chassis; a second hinge part that supports a first end of the second stand plate so as to be rotatable with respect to the second chassis; and a connecting portion that removably connects adjacent ends of the first stand plate and the second stand plate to each other.

The portable information device may be configured in such a way that the connecting portion includes: a magnet provided on the first stand plate; and an attracted object that is provided on the second stand plate and able to be attracted to the magnet.

The portable information device may be configured in such a way that the connecting portion includes: a lever member that is pivotably supported by the first stand plate and that is buried from the adjacent end of the first stand plate in the stacked form and protrudes from the adjacent end of the first stand plate in the flat-plate form; and an engaging recessed portion that is provided on the second stand plate and which the lever member is engageable with and disengageable from.

The portable information device may be configured in such a way that the connecting portion includes: a protruding portion provided on the first stand plate; and a receiving portion that is provided on the second stand plate and comes into contact with the protruding portion at least when the first stand plate moves from the housing position to the upright position.

The portable information device may be configured in such a way that the stand device further includes: a first cover part covering the back face of the first chassis; and a second cover part covering the back face of the second chassis, wherein the first stand plate is connected to the first cover part and wherein the second stand plate is connected to the second cover part.

A stand device according to the second aspect of the present invention includes: a first cover part; a second cover part used adjacent to the first cover part; a first stand plate movable between a housing position in which a first end is rotatably connected to the first cover part via a first hinge part and is arranged side by side with the first cover part in an in-plane direction and an upright position in which a second end protrudes in an out-of-plane direction of the first cover part; and a second stand plate movable between a housing position in which a first end is rotatably connected to the second cover part via a second hinge part and is arranged side by side with the second cover part in an in-plane direction and an upright position in which a second end protrudes in an out-of-plane direction of the second cover part, wherein the first stand plate and the second stand plate are switchable between a separated state in which their adjacent ends are spaced apart from each other so as to be configured separately and a connected state in which their adjacent ends are connected to each other so as to move together between the housing position and the upright position.

The stand device may further include a connecting portion that removably connects adjacent ends of the first stand plate and the second stand plate to each other.

The above-described aspects of present invention can provide both of high convenience and a simple configuration.

DETAILED DESCRIPTION OF THE INVENTION

Hereinafter, a portable information device according to the present invention will be described in detail with reference to appended drawings by giving preferred embodiments in relation to a stand device attached to the portable information device.

Figure 1:
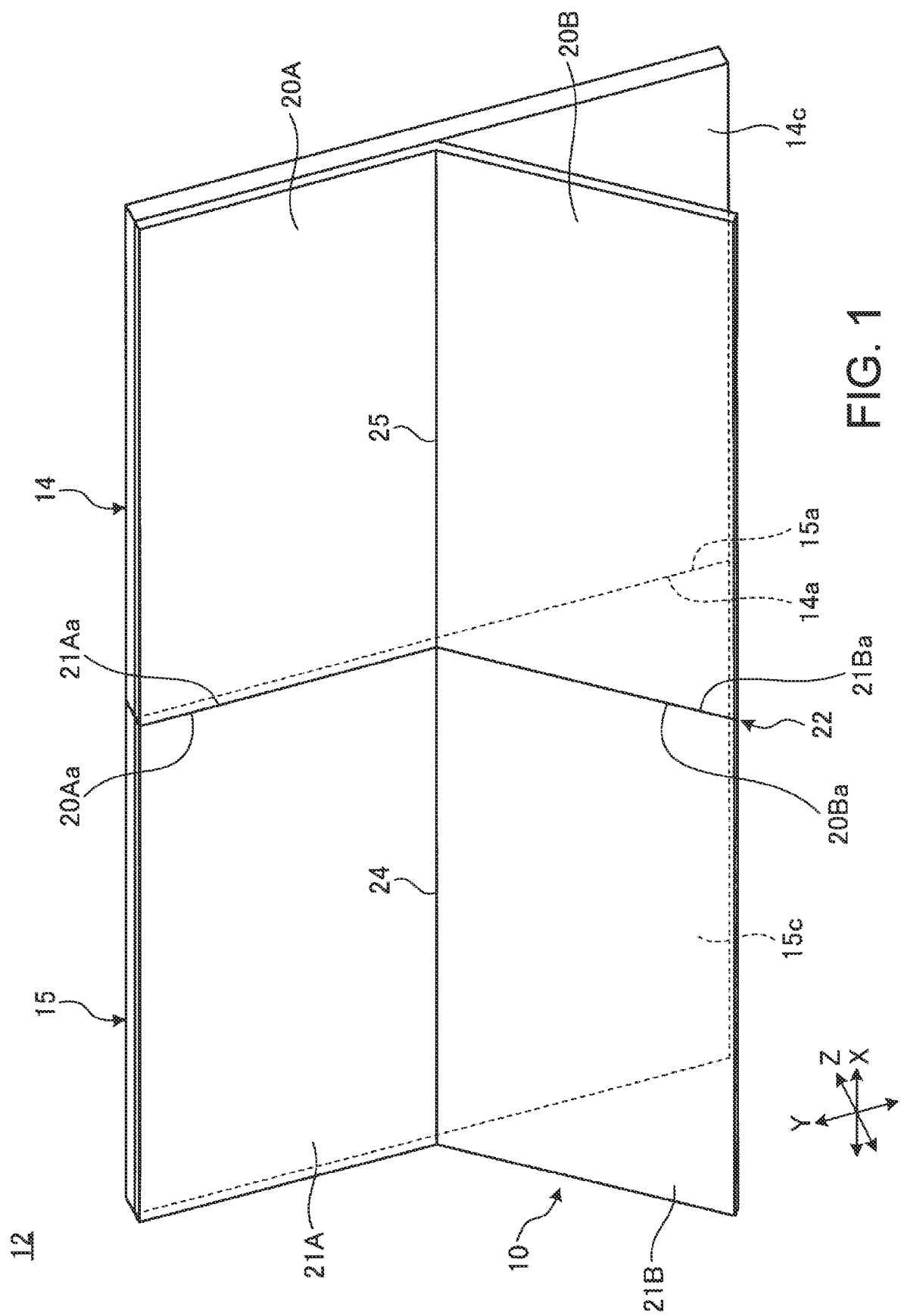
FIG. 1 is a schematic perspective view of a portable information device equipped with a stand device according to an embodiment.
Figure 2:
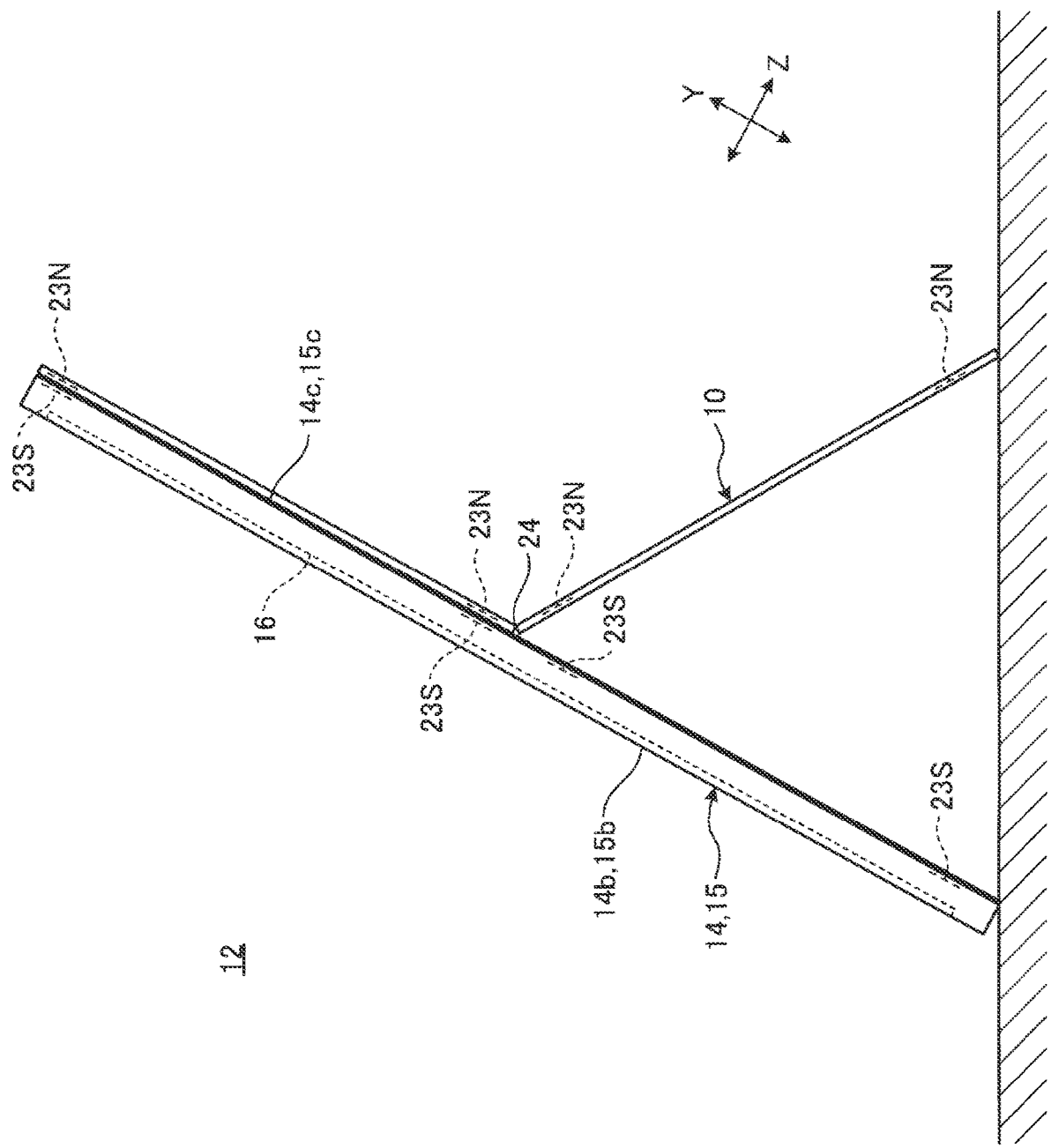
FIG. 2 is a side view of the portable information device illustrated in FIG. 1.
Figure 3A:
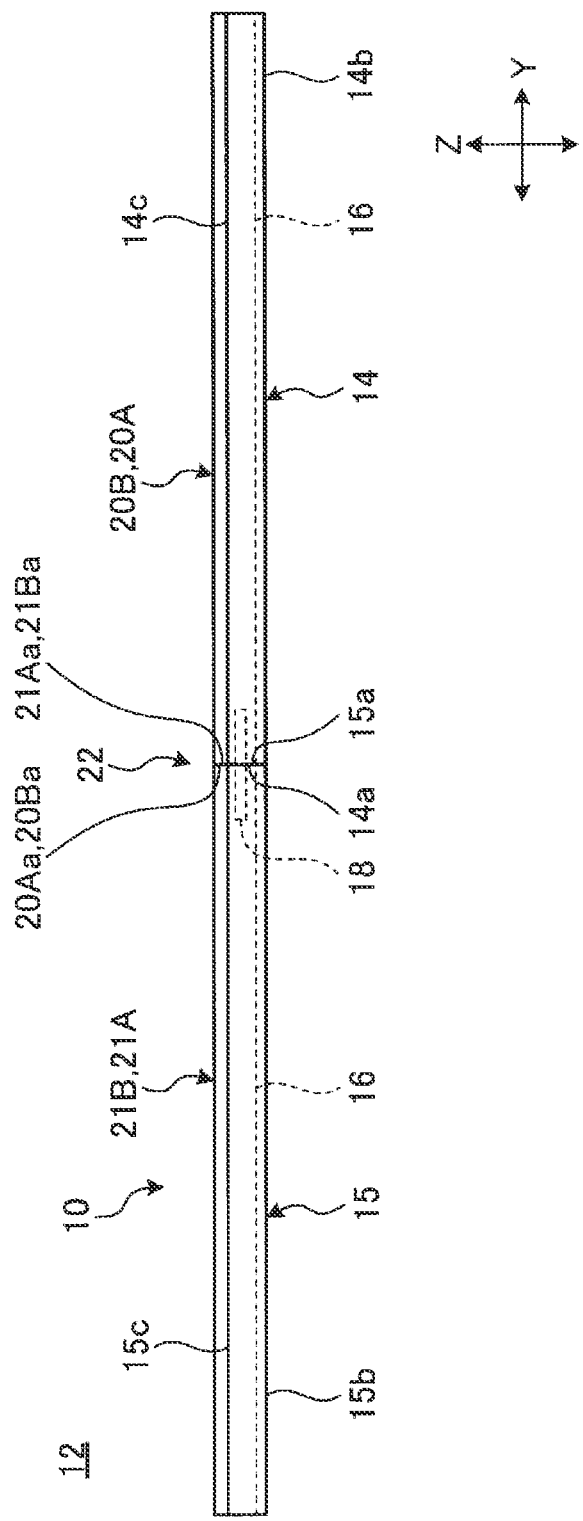
FIG. 3A is a schematic bottom view of the portable information device placed in a flat-plate form.
Figure 3B:
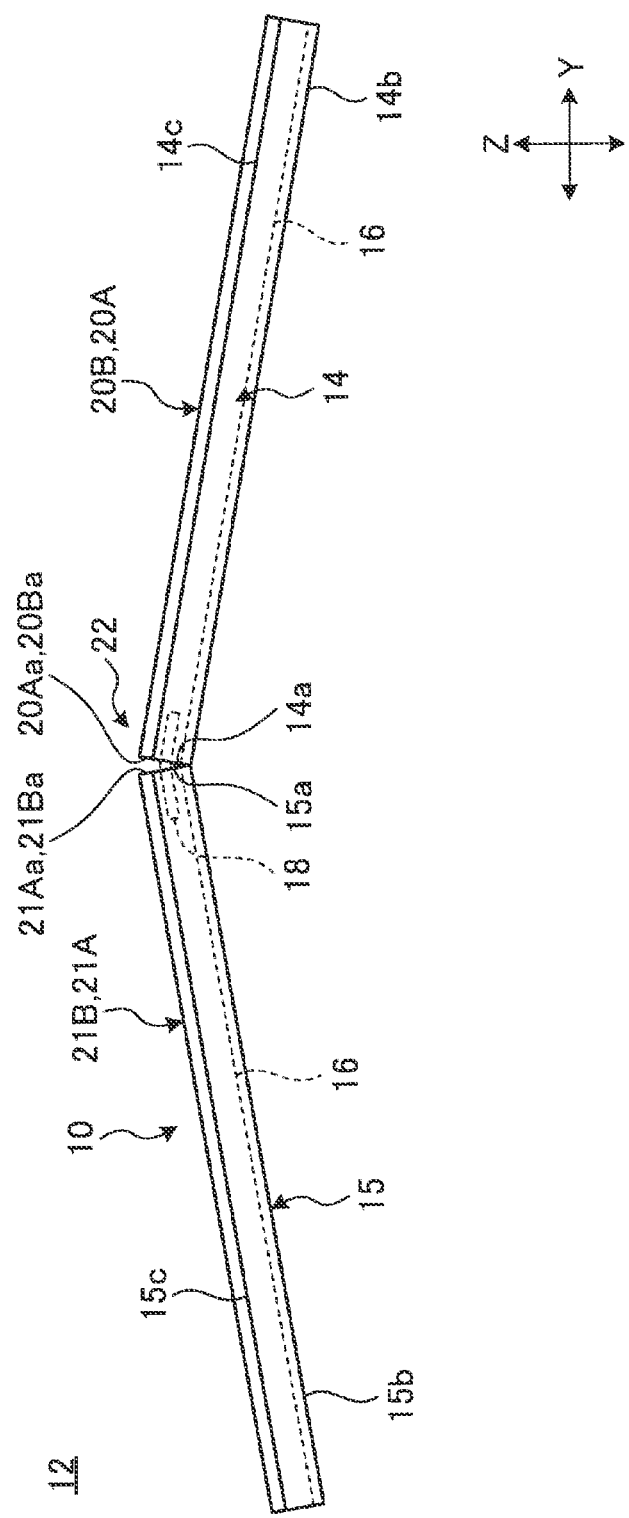
FIG. 3B is a schematic bottom view in the middle of changing the portable information device from the flat-plate form to a stacked form.
Figure 3C:
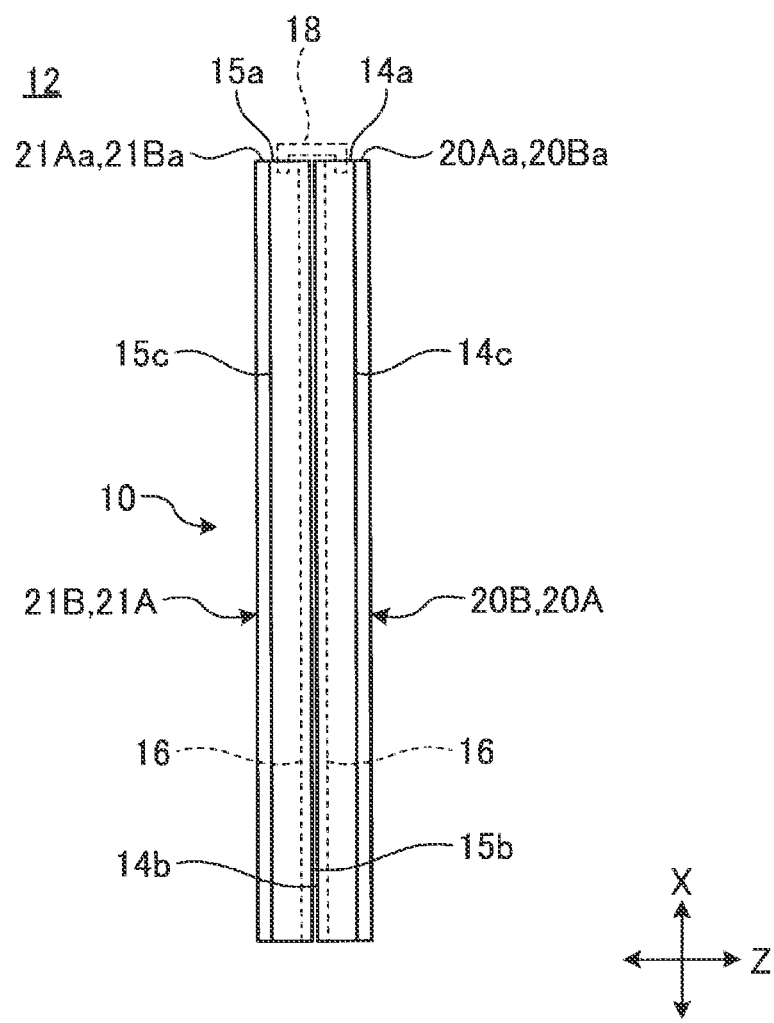
FIG. 3C is a schematic bottom view of the portable information device placed in the stacked form.

FIG. 1 is a schematic perspective view of a portable information device 12 equipped with a stand device 10 according to an embodiment. FIG. 1 is a diagram illustrating the portable information device 12 viewed from the back side thereof. FIG. 2 is a side view of the portable information device 12 illustrated in FIG. 1. FIGS. 3A to 3C are schematic bottom views illustrating actions of changing the portable information device 12 from a flat-plate form to a stacked form.

As illustrated in FIGS. 1 to 3C, the portable information device 12 includes a first chassis 14, a second chassis 15, a display 16, and a stand device 10. In this embodiment, a tablet PC foldable like a book is illustrated as the portable information device 12. The portable information device 12 may be, for example, a smartphone, a portable game machine, or the like besides the tablet PC.

The chasses 14 and 15 are arranged side by side, adjacent to each other. In the chasses 14 and 15, adjacent ends 14a and 15a thereof are connected to each other so as to be pivotable relatively via a hinge 18 (see FIGS. 3A to 3C). The chasses 14 and 15 are able to be changed to a flat-plate form in which their front faces 14b and 15b are arranged side by side in the in-plane direction (see FIGS. 1 and 3A) and to a stacked form in which the chasses 14 and 15 are stacked so that their front faces 14b and 15b face each other (see FIG. 3C). The configuration of the stacked form may be reversed to the configuration illustrated in FIG. 3C. Specifically, in the stacked form, the chasses 14 and 15 may be stacked so that their back faces 14c and 15c face each other. The first chassis 14 appropriately contains electronic components inside, such as a substrate, an antenna device, and the like with a central processing unit (CPU) implemented therein. The second chassis 15 appropriately contains electronic components inside, such as a battery and the like, which are not illustrated.

The display 16 is an organic electro luminescence (EL) flexible display, which extends across, for example, the front faces 14b and 15b of the respective chasses 14 and 15 and has a highly flexible paper structure in which the display 16 is foldable together when the chasses 14 and 15 are folded. In the display 16, a bent area is formed in a range of straddling the adjacent ends 14a and 15a of the chasses 14 and 15. The display 16 may be a dual display provided on the front faces 14b and 15b of the respective chasses 14 and 15.

Hereinafter, the stand device 10 and the portable information device 12 will be described by referring to the traverse direction of the chasses 14 and 15 as "X direction," the longitudinal direction of the adjacent ends 14a and 15a of the chasses 14 and 15 as "Y direction," and the thickness direction of the chasses 14 and 15 as "Z direction."

Figure 4:
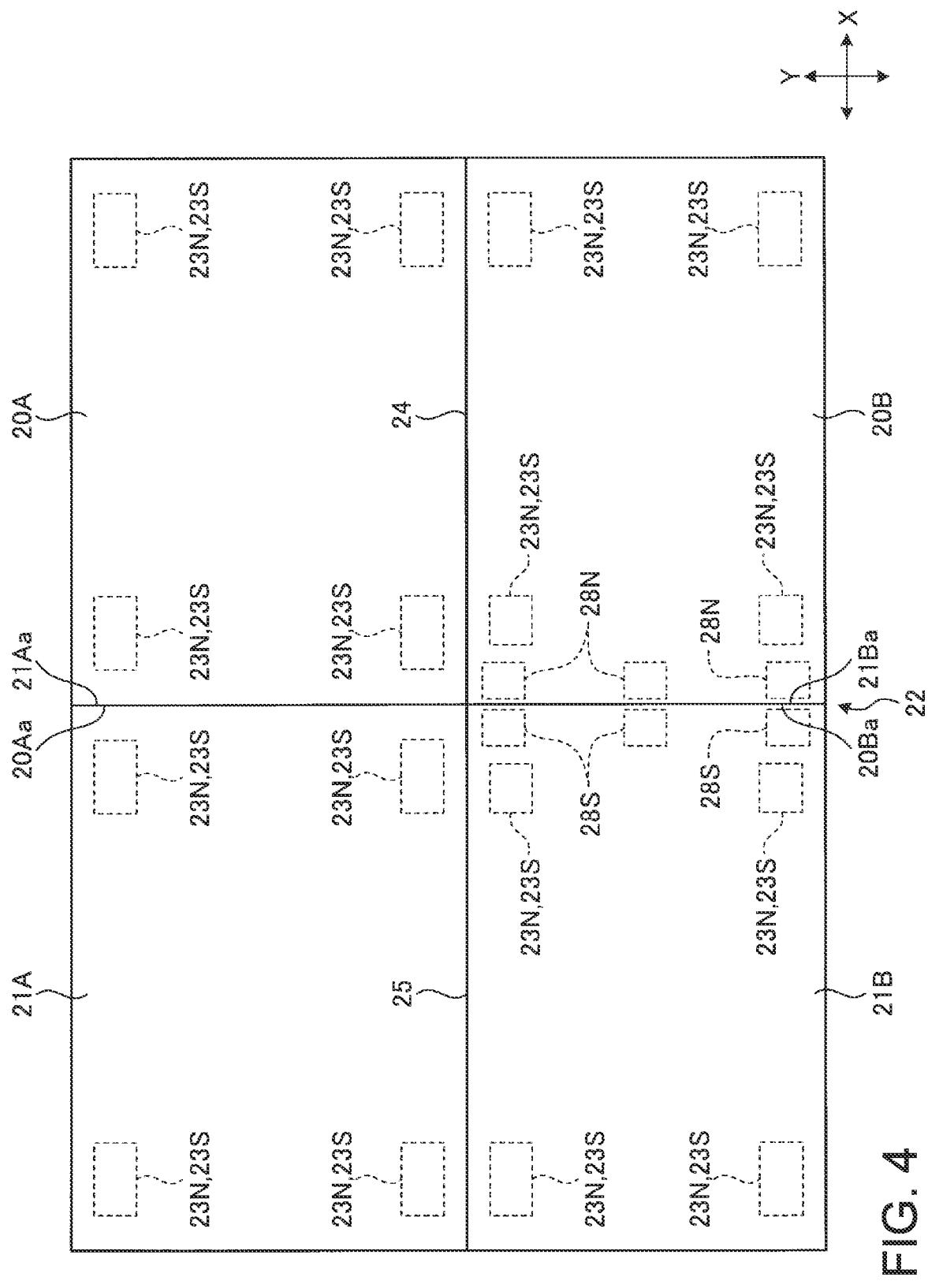
FIG. 4 is a schematic rear view of the stand device.

The following describes the specific configuration example of the stand device 10. FIG. 4 is a schematic rear view of the stand device 10.

As illustrated in FIGS. 1 to 4, the stand device 10 includes a first cover part 20A and a first stand plate 20B attached to the back face 14c of the first chassis 14, a second cover part 21A and a second stand plate 21B attached to the back face 15c of the second chassis 15, and a connecting portion 22. The stand device 10 according to this embodiment has a protection/decoration function of covering the back faces 14c and 15c of the portable information device 12 and a stand function of holding the portable information device 12 in an upright posture.

The first cover part 20A and the first stand plate 20B are arranged side by side in the Y direction and form a rectangular plate-shaped member that covers the back face 14c of the first chassis 14 as a whole.

The first cover part 20A is removably fixed to the back face 14c by an attractive action between a magnet 23N (see FIGS. 2 and 4) provided, for example, at each of the four corners and a magnet 23S provided at each of the opposing positions on the back face 14c. With respect to the magnets 23N and 23S, if one is a magnet, the other may be an attracted object made of magnetic material such as metal. The first cover part 20A may be fixed to the back face 14c with a double-sided tape or the like, which is not illustrated, instead of the magnets 23N and 23S, or may be fixed with screws or the like.

The first stand plate 20B is rotatably connected to the lower end of the first cover part 20A via the first hinge part 24. Thus, the first stand plate 20B is movable between the housing position illustrated in FIG. 3A and the upright position illustrated in FIG. 1. Specifically, in the housing position, the first stand plate 20B is arranged along the back face 14c and is fixed to the back face 14c by the attractive action of the magnets 23N and 23S similarly to those of the first cover part 20A. In the upright position, the first stand plate 20B is stripped from the back face 14c against the attractive forces of the magnets 23N and 23S and is arranged in a position in which the lower end opposite to the first hinge part 24 side pivots in such a way as to protrude from the back face 14c.

The structure of the first hinge part 24 is not limited as long as the first stand plate 20B can be positioned in the housing position and in the upright position at one or more angles. The first hinge part 24 may be configured to be, for example, a torque hinge so that the first stand plate 20B can be positioned and fixed at a desired angle steplessly. The first hinge part 24 may have a ratchet structure that enables the first stand plate 20B to be positioned and fixed at every constant angle from, for example, the housing position to the upright position. The first hinge part 24 having the ratchet structure may be configured to be able to position and fix the first stand plate 20B only in the housing position and in one or more upright positions and to freely pivot the first stand plate 20B at other angles.

Since the second cover part 21A and the second stand plate 21B have the same configuration as the first cover part 20A and the first stand plate 20B, the detailed description is omitted. Specifically, the second cover part 21A and the second stand plate 21B are also arranged side by side in the Y direction and form a rectangular plate member that covers the back face 15c of the second chassis 15 as a whole. The second hinge part 25, which connects the second cover part 21A and the second stand plate 21B, may have the same structure as the structure of the first hinge part 24.

The cover parts 20A and 21A and the stand plates 20B and 21B each have a structure in which a thin flat plate made of, for example, glass epoxy resin, polycarbonate, carbon, or the like as a core material is wrapped with a skin material such as leather, artificial leather, cloth, or the like. Alternatively, the cover parts 20A and 21A and the stand plates 20B and 21B may be configured to be made of only a hard core material without the skin material. Furthermore, the cover parts 20A and 21A are not required to be rigid like the stand plates 20B and 21B and therefore may be configured to be made of only soft skin material without a core material.

When the portable information device 12 is placed in the flat-plate form, the cover parts 20A and 21A form a single cover part with their adjacent ends 20Aa and 21Aa in contact with each other (see FIGS. 1 and 4). In this condition, the stand plates 20B and 21B are placed in the connected state with their adjacent ends 20Ba and 21Ba in contact with each other and integrally connected to each other at the connecting portion 22. As a result, the stand plates 20B and 21B are movable to the housing position and to the upright position as a single stand plate (see FIG. 1).

When the portable information device 12 is in the stacked form, the cover parts 20A and 21A individually cover the back faces 14c and 15c of the chasses 14 and 15 with their adjacent ends 20Aa and 21Aa spaced apart from each other (see FIG. 3C). In this condition, the stand plates 20B and 21B are placed in the separated states with their adjacent ends 20Ba and 21Ba also spaced apart from each other. Therefore, the stand plates 20B and 21B are also placed in the housing position, individually covering the back faces 14c and 15c of the respective chasses 14 and 15 (see FIG. 3C).

Figure 5A:
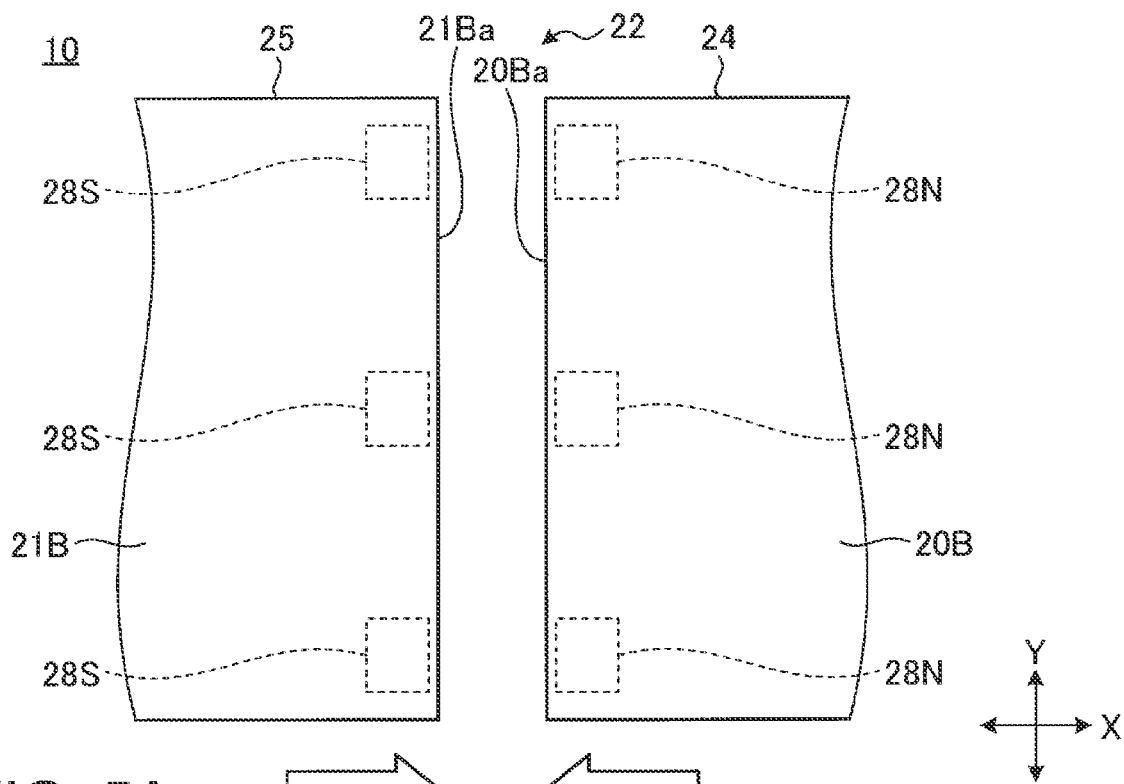
FIG. 5A is a schematic rear view of a connecting portion and its peripheral portion in the case where stand plates are placed in a separated state.
Figure 5B:
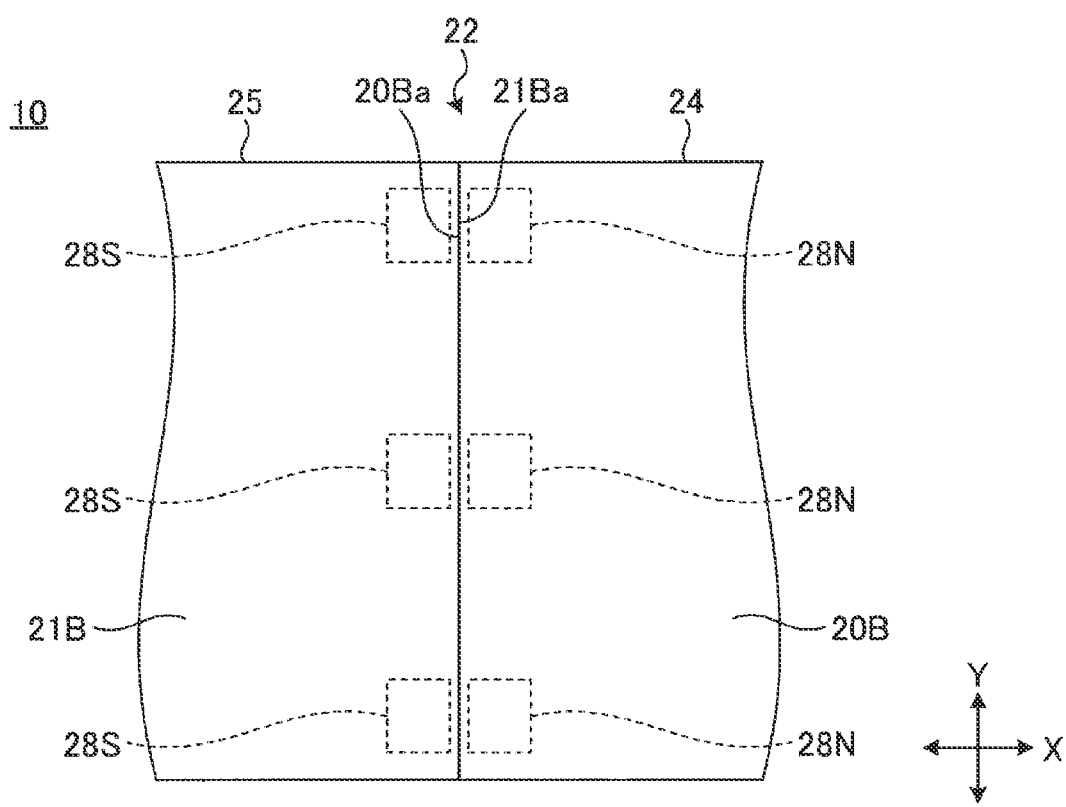
FIG. 5B is a rear view in the case where the stand plates illustrated in FIG. 5A are placed in a connected state.

FIGS. 5A and 5B are explanatory diagrams each schematically illustrating the configuration of the connecting portion 22. FIG. 5A illustrates the stand plates 20B and 21B in the separated state, and FIG. 5B illustrates the stand plates 20B and 21B in the connected state.

As illustrated in FIGS. 4 to 5B, the connecting portion 22 has magnets 28N and 28S that attract each other. One magnet 28N is buried in the first stand plate 20B and faces the second stand plate 21B from the adjacent end 20Ba. The other magnet 28S is buried in the second stand plate 21B and faces the first stand plate 20B from the adjacent end 21Ba. With respect to the magnets 28N and 28S, if one is a magnet, the other may be an attracted object made of magnetic material such as metal.

The following describes a function of the stand device 10 in the case of changing the portable information device 12 between the stacked form illustrated in FIG. 3C and the flat-plate form illustrated in FIG. 3A.

First, to change the portable information device 12 from the stacked form to the flat-plate form, the side edges of the right and left chasses 14 and 15 are grasped to open the gap between the chasses 14 and 15 via the hinge 18. Thus, the stand plates 20B and 21B are connected to each other with their adjacent ends 20Ba and 21Ba coming into contact with each other and by the attractive forces of the magnets 28N and 28S (see FIGS. 4 and 5B). Thereby, the stand device 10 covers the entire back faces 14c and 15c of the portable information device 12 in a single plate form.

When using the portable information device 12 in the flat-plate form by erecting it with the stand device 10, one or both side edges of the right and left stand plates 20B and 21B are grasped to pivot the stand plates 20B and 21B against the attractive forces of the magnets 23N and 23S. Thereby, the right and left stand plates 20B and 21B move together up to a desired upright position by a connecting action of the connecting portion 22. Therefore, the lower ends of the stand plates 20B and 21B are landed on a desk or the like and further the lower ends of the chasses 14 and 15 are also landed on the desk or the like, by which the portable information device 12 is held in the upright posture illustrated in FIGS. 1 and 2. With respect to the connecting portion 22 in the configuration example illustrated in FIGS. 4 to 5B, the attractive force of the entire magnets 28N and 28S needs to be sufficiently stronger than the attractive force of the entire magnets 23N and 23S in order to pivot the stand plates 20B and 21B in the connected state from the housing position to the upright position.

When using the portable information device 12 in the flat-plate form without erecting it again, the stand plates 20B and 21B, which are connected to each other by the connecting portion 22 so as to be formed in a single plate, are pushed down to the housing position. Thereby, the stand plates 20B and 21B are fixed to the back faces 14c and 15c of the chasses 14 and 15 by the attractive forces of the magnets 23N and 23S and are held in the housing position. Thus, the portable information device 12 in the flat-plate form constitutes a single plate as a whole and the stand plates 20B and 21B do not get in the way.

Subsequently, when changing the portable information device 12 from the flat-plate form to the stacked form, the right and left chasses 14 and 15 are grasped to fold the part between the chasses 14 and 15 via the hinge 18. Thereby, the stand plates 20B and 21B are placed into the separated state since their adjacent ends 20Ba and 21Ba relatively move in a direction of being separated from each other, by which the magnets 28N and 28S are spaced apart from each other (see FIG. 3B). Finally, the part between the chasses 14 and 15 are folded into the stacked form illustrated in FIG. 3C. Thereby, the stand device 10 is placed in a state in which the first cover part 20A and the first stand plate 20B cover the back face 14c of the first chassis 14 and the second cover part 21A and the second stand plate 21B cover the back face 15c of the second chassis 15. In other words, in the portable information device 12, the outer surfaces (the back faces 14c and 15c) of the chasses 14 and 15 in the stacked form are covered with the cover parts 20A and 21A and with the stand plates 20B and 21B.

The connecting portion may be configured differently from the connecting portion 22 as long as the right and left stand plates 20B and 21B are switchable between the connected state and the separated state. Therefore, the following describes modifications of the connecting portion sequentially.

Figure 6A:
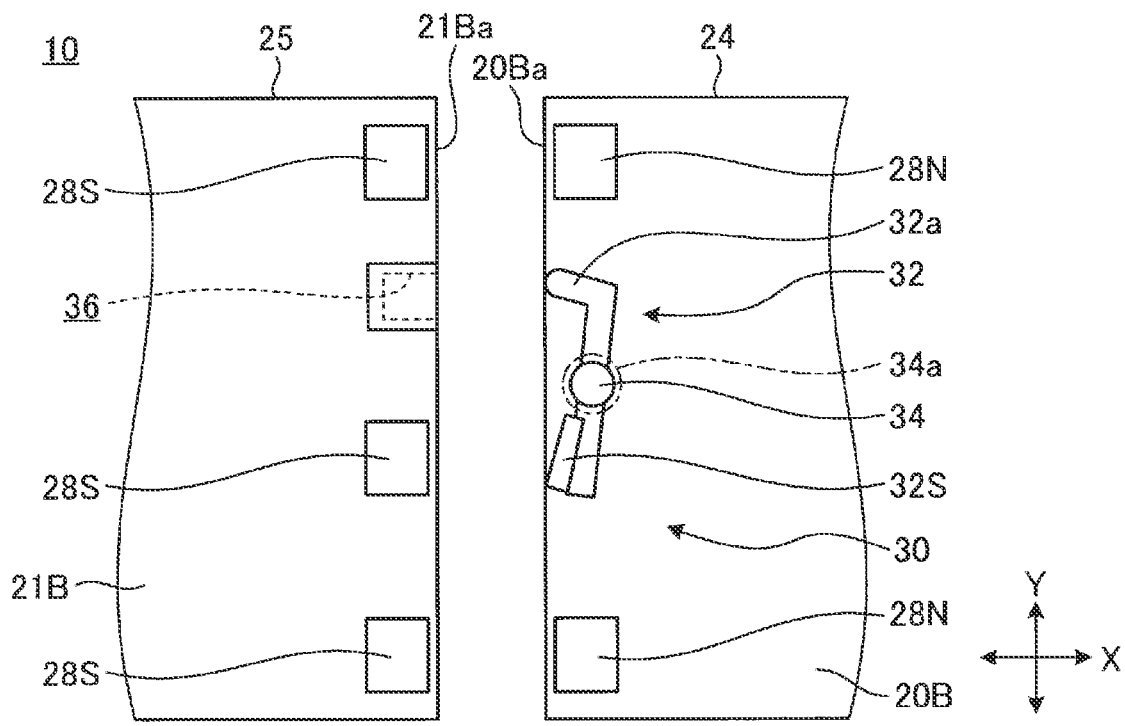
FIG. 6A is a schematic rear view of a connecting portion according to a first modification and its peripheral portion in the case where stand plates with the connecting portion are placed in a separated state.
Figure 6B:
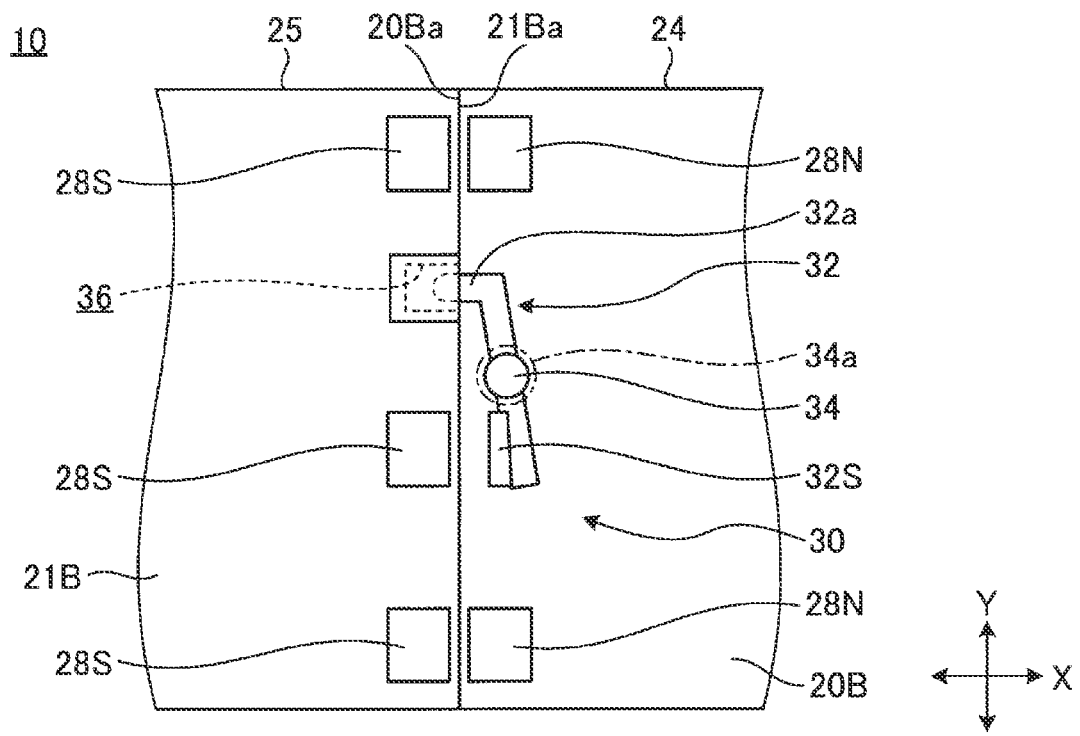
FIG. 6B is a rear view in the case where the stand plates illustrated in FIG. 6A are placed in a connected state.

FIGS. 6A and 6B are plan views schematically illustrating the configuration of a connecting portion 30 according to a first modification. FIGS. 6A and 6B each illustrate the internal structure of the stand plates 20B and 21. The connecting portion 30 illustrated in FIGS. 6A and 6B is configured to have a lever member 32 additionally, in comparison with the connecting portion 22 illustrated in FIGS. 5A and 5B.

The lever member 32 is arranged in the first stand plate 20B and is pivotably supported on the first stand plate 20B via the rotary shaft 34. The lever member 32 has an engagement piece 32a protruding toward the second stand plate 21B side at a first end and a magnet 32S at a second end. The engagement piece 32a can appear and disappear from the opening, which is formed in the adjacent end 20Ba. The magnet 32S is arranged so as to face the adjacent end 20Ba. A torsion coil spring 34a is wrapped around the rotary shaft 34. The lever member 32 is always biased in the backward direction (clockwise in FIG. 6A) in which the engagement piece 32a is buried from the adjacent end 20Ba around the rotary shaft 34 by the torsion coil spring 34a.

The second stand plate 21B is provided with an engaging recessed portion 36 which the engagement piece 32a is engageable with and disengageable from. The engaging recessed portion 36 is open at the adjacent end 21Ba. One of the magnets 28S on the second stand plate 21B side is located at a position where a repulsive force (repelling force) can be generated between the magnet 28S and the magnet 32S. The connecting portion 30 may be configured in such a way that the lever member 32 is provided on the second stand plate 21B and the engaging recessed portion 36 is provided in the first stand plate 20B. Furthermore, the connecting portion 30 may have a configuration in which the first stand plate 20B provided with the lever member 32 is combined with the second stand plate 21B provided with the lever member 32. A plurality of lever members 32 may be arranged along the adjacent end 20Ba or 21Ba.

In the stand device 10 having the above-described connecting portion 30, the stand plates 20B and 21B are stably connected to each other by attractive forces of the magnets 28N and 28S when the form of the portable information device 12 changes from the stacked form to the flat-plate form. On the other hand, the magnet 32S generates a repulsive force between the magnet 32S and the magnet 28S, and the lever member 32 rotates counterclockwise in FIG. 6A against the biasing force of the torsion coil spring 34a. As a result, the engagement piece 32a protrudes from the adjacent end 20Ba and engages with the engaging recessed portion 36 while straddling the adjacent ends 20Ba and 21Ba (see FIG. 6B). The engagement state of the engagement piece 32a and the engaging recessed portion 36 is maintained while the repulsive force between the magnets 28S and 32S is generated, in other words, in the flat-plate form.

Therefore, the connecting portion 30 physically connects the stand plates 20B and 21B to each other by the engaging action between the engagement piece 32a and the engaging recessed portion 36 in addition to the attractive action of the magnets 28N and 28S. This further increases the connection strength of the stand plates 20B and 21B during moving between the housing position and the upright position, thereby further suppressing the occurrence of a problem that the connected state between the stand plates 20B and 21B is accidentally released during the moving. When the portable information device 12 is placed in the stacked form, the stand plates 20B and 21B are separated from each other and the magnet 32S is spaced apart from the magnet 28S. This causes the lever member 32 to return to the position illustrated in FIG. 6A by the biasing force of the torsion coil spring 34a. As a result, the engagement piece 32a enters the first stand plate 20B from the adjacent end 20Ba, thereby preventing the engagement piece 32a from being exposed on the appearance, which degrades the appearance quality.

In the connecting portion 30, preferably the magnets 28N and 28S are used together with the lever member 32 in order to prevent rattling between the stand plates 20B and 21B. The connecting portion 30, however, may be configured to enable only the engaging action between the lever member 32 and the engaging recessed portion 36 without the magnets 28N and 28S, and the same applies to connecting portions 40, 50, and 60 described later.

FIGS. 7A to 7F are explanatory diagrams schematically illustrating the configuration of the connecting portion 40 according to a second modification. The connecting portion illustrated in FIGS. 7A to 7F is configured to have protruding portions 42A and 42B and receiving portions 43A and 43B additionally in comparison with the connecting portion 22 illustrated in FIGS. 5A and 5B.

As illustrated in FIGS. 7A to 7F, the protruding portion 42A is a plate piece protruding from the adjacent end 20Ba of the first stand plate 20B toward the second stand plate 21B side. The protruding portion 42B is a plate piece protruding from the adjacent end 21Ba of the second stand plate 21B toward the first stand plate 20B side. The protruding portions 42A and 42B are arranged side by side in the Y direction.

The receiving portion 43A is the bottom of a recessed portion formed so as to recede from the adjacent end 20Ba of the first stand plate 20B. The receiving portion 43A is formed so as to face the protruding portion 42B and to be alternated with the protruding portion 42B in the Z direction.

The receiving portion 43B is the bottom of a recessed portion that is formed so as to recede from the adjacent end 21Ba of the second stand plate 21B. The receiving portion 43B is formed so as to face the protruding portion 42A and to be alternated with the protruding portion 42A in the Z direction.

In the stand device 10 having the above-described connecting portion 40, the stand plates 20B and 21B are stably connected to each other by attractive forces of the magnets 28N and 28S when the form of the portable information device 12 changes from the stacked form to the flat-plate form. On the other hand, the protruding portion 42A comes into contact with the receiving portion 43B and, in a direction opposite thereto, the protruding portion 42B comes into contact with the receiving portion 43A. Thereby, the stand plates 20B and 21B are also physically connected to each other by a locking action of the protruding portions 42A and 42B to the receiving portions 43B and 43A in addition to the attractive action of the magnets 28N and 28S.

Figure 7A:
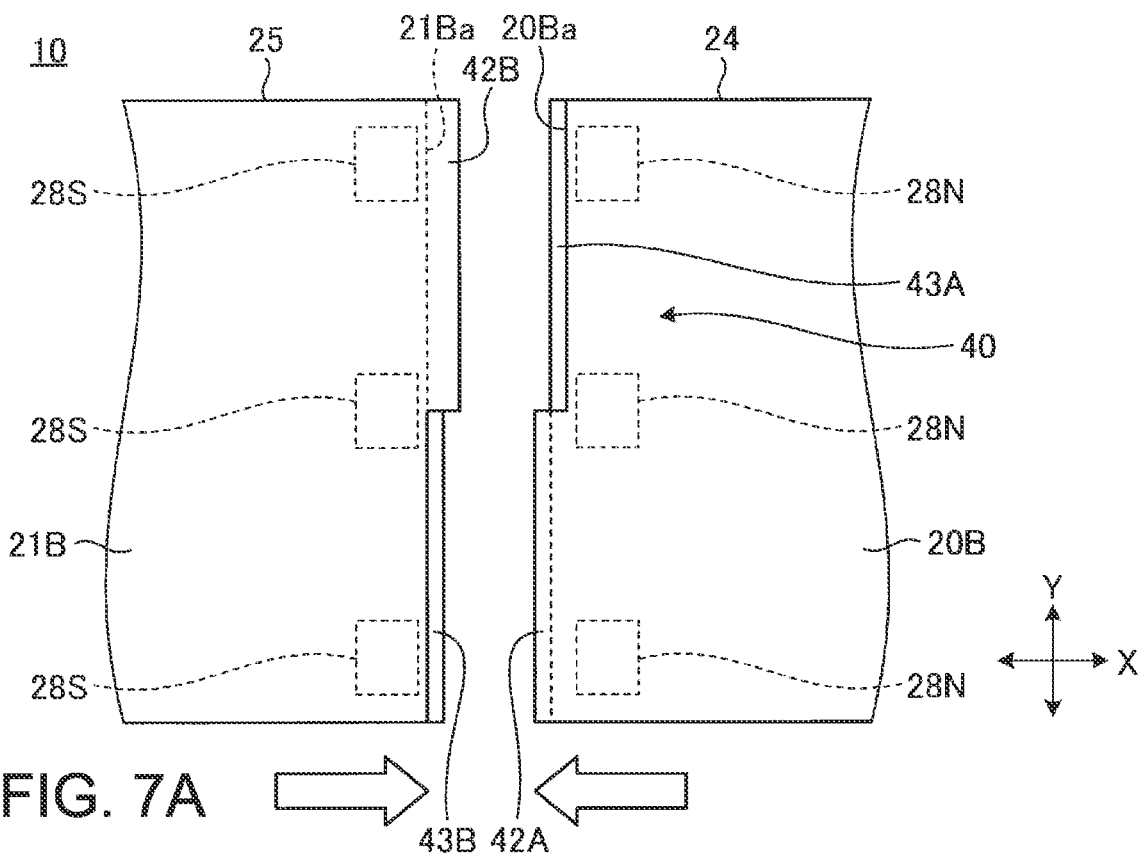
FIG. 7A is a schematic rear view of a connecting portion according to a second modification and its peripheral portion in the case where stand plates with the connecting portion are placed in a separated state.
Figure 7B:
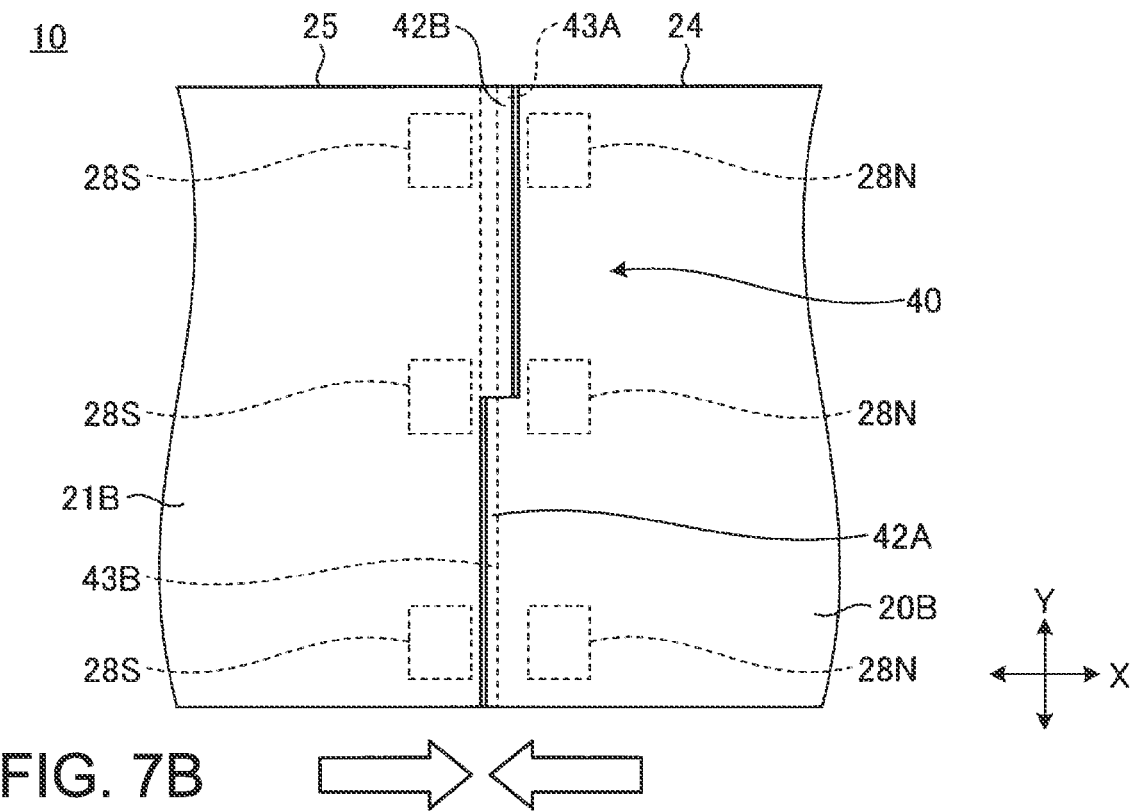
FIG. 7B is a rear view in the case where the stand plates illustrated in FIG. 7A are placed in a connected state.
Figure 7C:
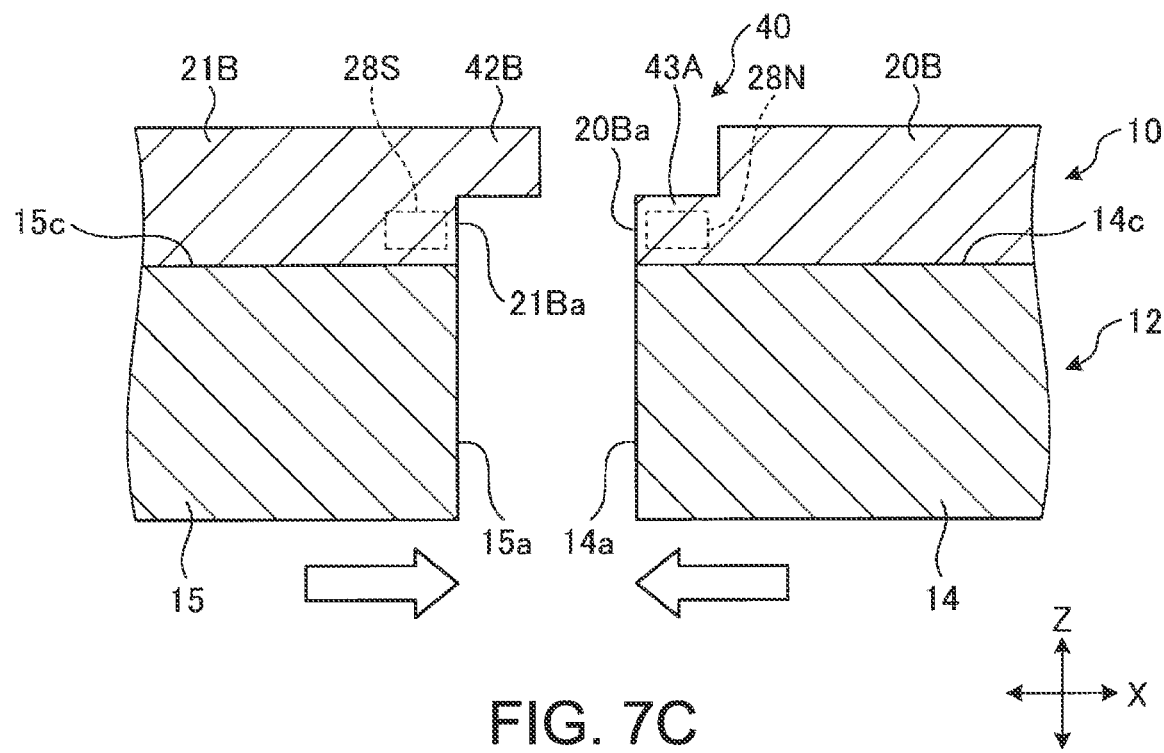
FIG. 7C is a schematic bottom cross-sectional view at a position along one protruding portion and a receiving portion therefor illustrated in FIG. 7A.
Figure 7D:
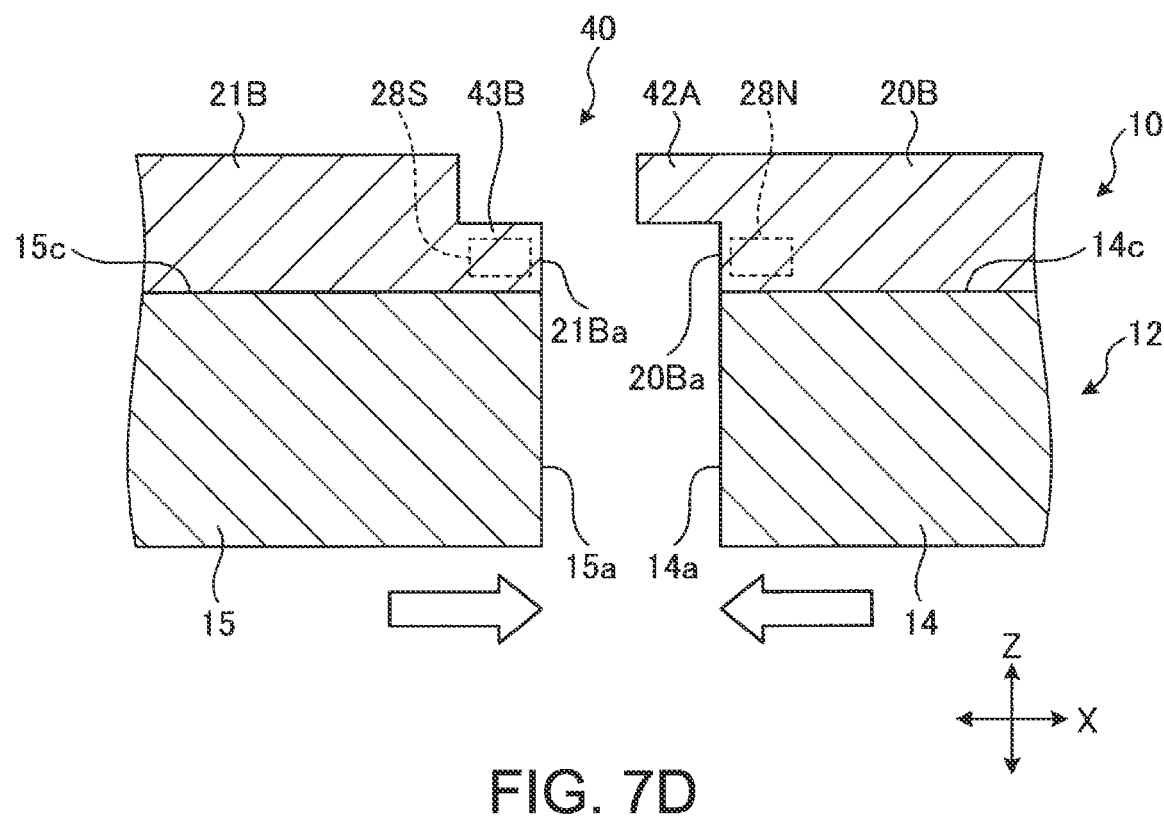
FIG. 7D is a schematic bottom cross-sectional view at a position along the other protruding portion and a receiving portion therefor illustrated in FIG. 7A.
Figure 7E:
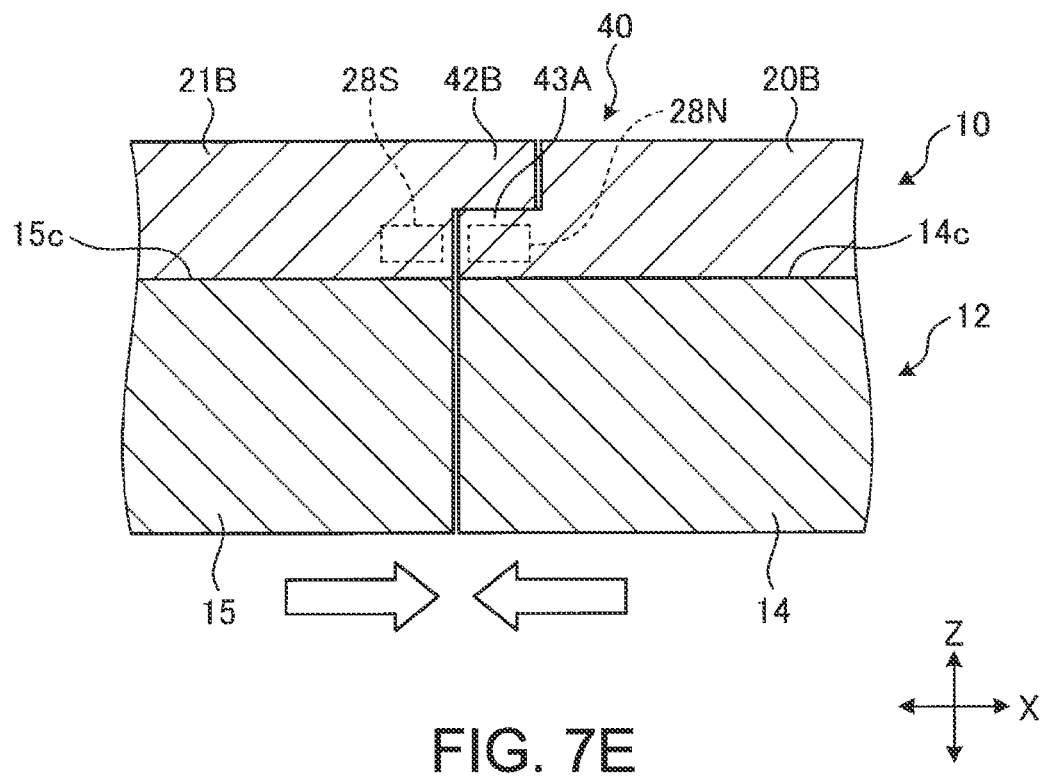
FIG. 7E is a bottom cross-sectional view in the case where one protruding portion and the receiving portion therefor illustrated in FIG. 7C are placed in a connected state.
Figure 7F:
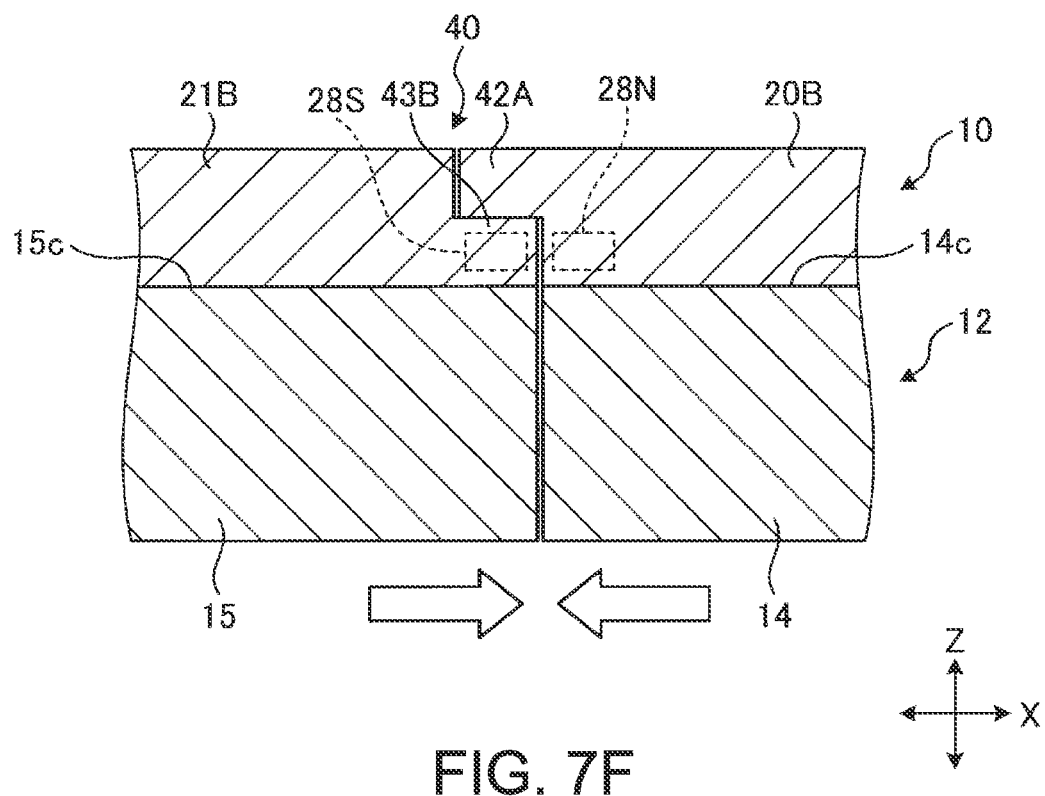
FIG. 7F is a bottom cross-sectional view in the case where the other protruding portion and the receiving portion therefor illustrated in FIG. 7D are placed in a connected state.

In other words, when the stand plates 20B and 21B formed into a single plate move from the housing position to the upright position, the receiving portions 43A and 43B are locked to the protruding portions 42B and 42A, respectively, thereby physically preventing the separation between the stand plates 20B and 21B (see FIGS. 7E and 7F). In addition, when the stand plates 20B and 21B formed into a single plate move from the upright position to the housing position, the protruding portions 42A and 42B are locked to the receiving portions 43B and 43A, respectively, thereby physically preventing the separation between the stand plates 20B and 21B (see FIGS. 7E and 7F). The connecting portion 40 is only required to be able to restrict at least the movement of the stand plates 20B and 21B in a direction from the housing position to the upright position.

Figure 8:
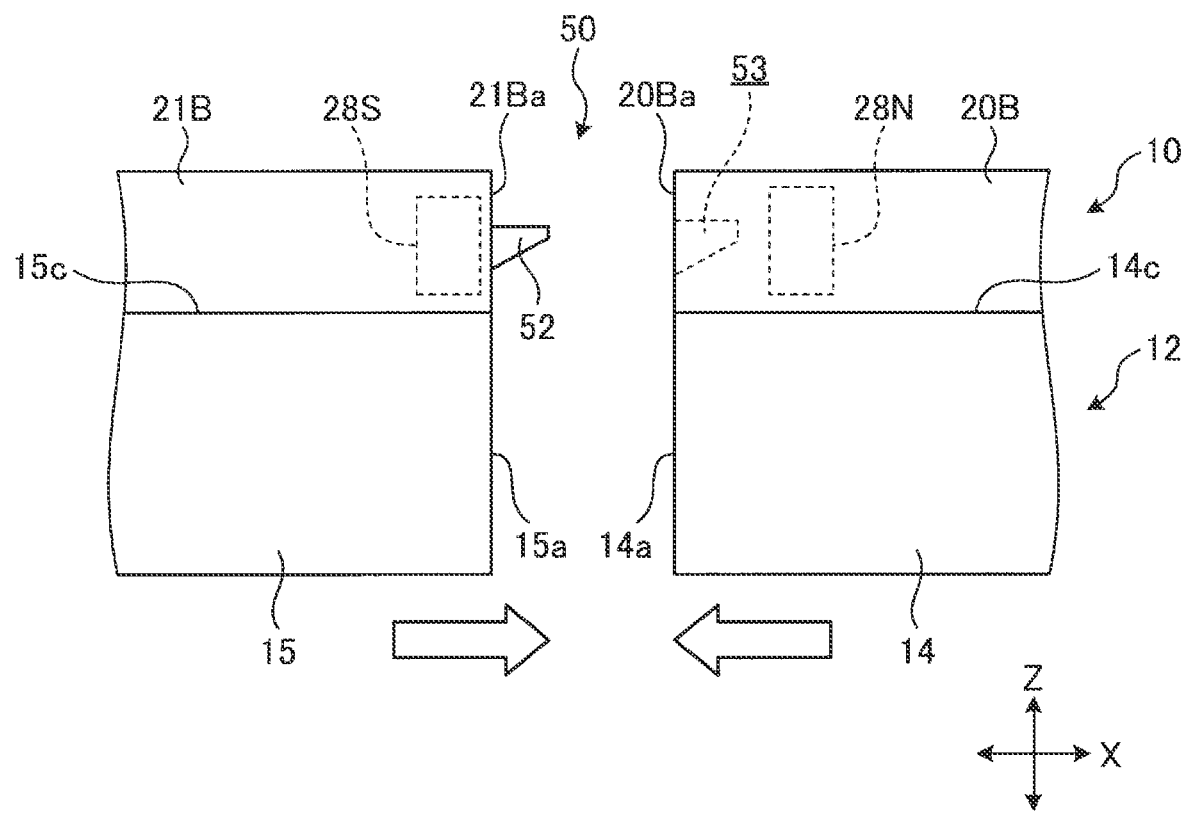
FIG. 8 is a bottom view schematically illustrating a configuration of a connecting portion according to a third modification and its peripheral portion.

FIG. 8 is an explanatory diagram schematically illustrating the configuration of a connecting portion 50 according to a third modification. The connecting portion 50 illustrated in FIG. 8 is configured to have a protruding portion 52 and a receiving portion 53 different in shape from the protruding portions 42A and 42B and the receiving portions 43A and 43B of the connecting portion 40 illustrated in FIG. 7A and the like.

The protruding portion 52 is a plate piece protruding from the adjacent end 21Ba of the second stand plate 21B toward the first stand plate 20B side. The protruding portion 52 has, for example, a substantially triangular shape in a side view. The receiving portion 53, which is open at the adjacent end 20Ba of the first stand plate 20B, is a recessed portion which the protruding portion 52 is engageable with and disengageable from. A plurality of protruding portions 52 and receiving portions 53 are arranged side by side in the Y direction. The configuration of the connecting portion 50 may be made in such a way that some protruding portions 52 of the plurality of protruding portions 52 and receiving portions 53 are provided on the first stand plate 20B side and some receiving portions 53 thereof are provided on the second stand plate 21B side, so that the protruding portions 52 are arranged alternately in the Y direction.

Also in the stand device 10 having the connecting portion 50 described above, a change in the form of the portable information device 12 from the stacked form to the flat-plate form stably connects the stand plates 20B and 21B to each other by the attractive forces of the magnets 28N and 28S. Simultaneously therewith, the protruding portion 52 engages with the receiving portion 53. Thereby, the stand plates 20B and 21B are physically connected to each other by the engaging action between the protruding portion 52 and the receiving portion 53, in addition to the attractive action of the magnets 28N and 28S.

Figure 9A:
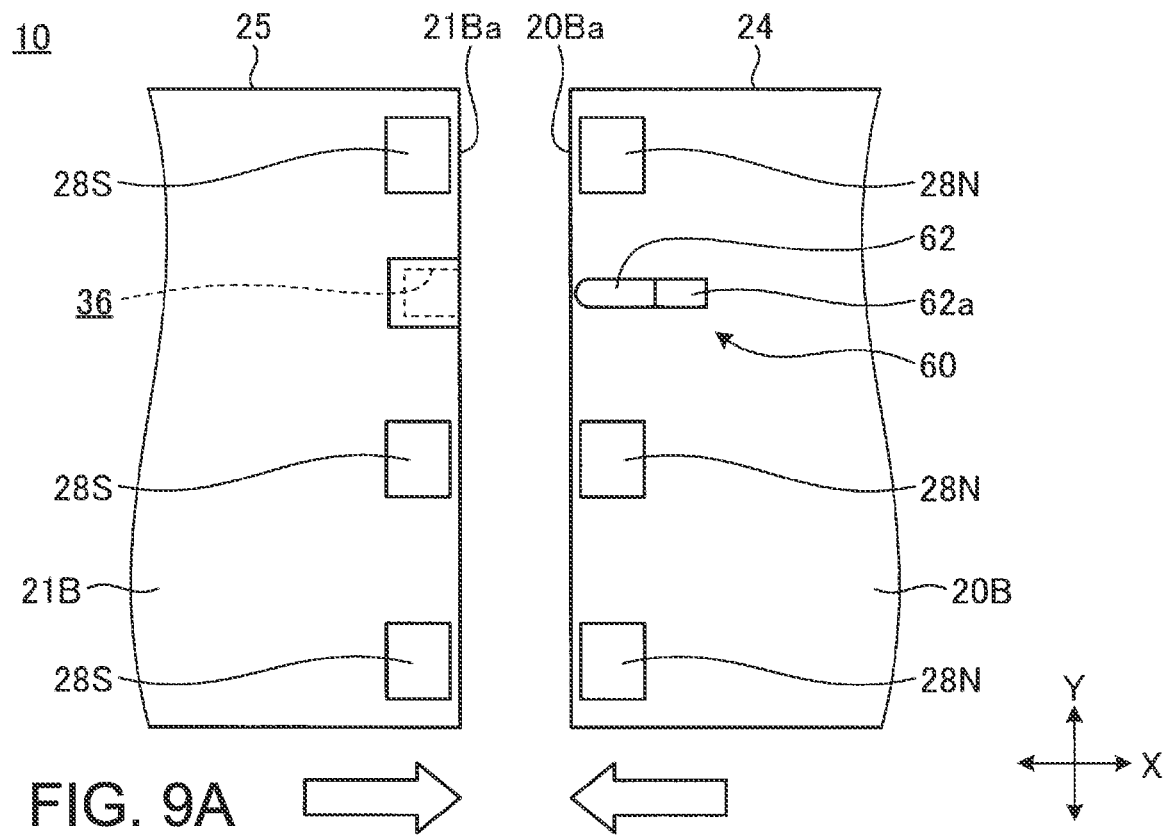
FIG. 9A is a schematic rear view of a connecting portion according to a fourth modification and its peripheral portion in the case where stand plates with the connecting portion are placed in a separated state.
Figure 9B:
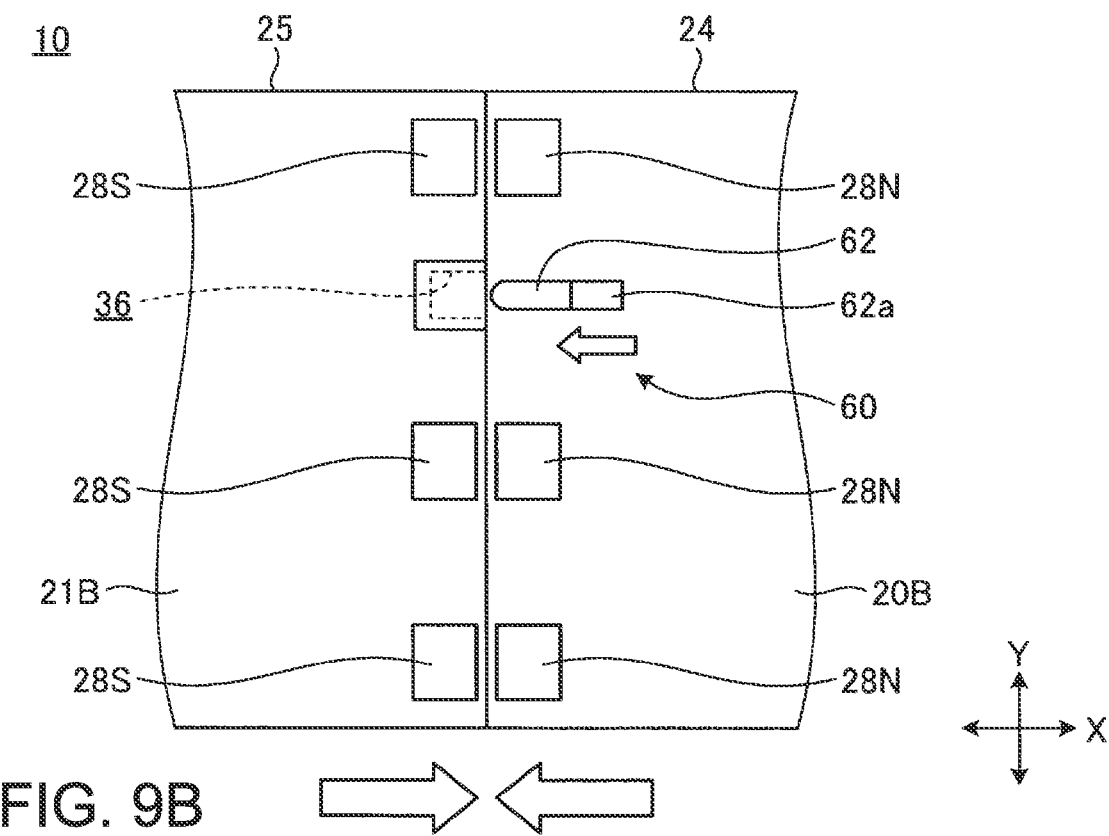
FIG. 9B is a rear view in the case where the stand plates illustrated in FIG. 9A are placed in a connected state.

FIGS. 9A and 9B are explanatory diagrams schematically illustrating the configuration of a connecting portion 60 according to a fourth modification. The connecting portion 60 illustrated in FIGS. 9A and 9B is configured to have a slide member 62, with which the lever member 32 of the connecting portion 30 illustrated in FIGS. 6A and 6B is replaced.

The slide member 62 is contained in the inside of the first stand plate 20B while being supported slidably in the X direction with respect to the first stand plate 20B. The slide member 62 is a strip-shaped member having a tapered tip. On the proximal end of the slide member 62, an operating part 62a is protruding. The operating part 62a is exposed from a long hole extending in the X direction, which is not illustrated, formed on the outer surface of the first stand plate 20B, so that a user is able to slide the operating part 62a in the X direction.

In the stand device 10 equipped with the above-described connecting portion 60, the stand plates 20B and 21B are stably connected to each other by attractive forces of the magnets 28N and 28S when the form of the portable information device 12 changes from the stacked form to the flat-plate form. Therefore, the user slides the slide member 62 to the second stand plate 21B side via the operating part 62a. Thereby, the distal end of the slide member 62 engages with the engaging recessed portion 36 on the second stand plate 21B side while straddling the adjacent ends 20Ba and 21Ba. As a result, the stand plates 20B and 21B are physically connected to each other by the engaging action between the slide member 62 and the engaging recessed portion 36 in addition to the attractive action of the magnets 28N and 28S.

As described above, the portable information device 12 of this embodiment includes the stand device 10. In addition, the first stand plate 20B and the second stand plate 21B of the stand device 10 are switchable between the separated state, in which their adjacent ends 20Ba and 21Ba are spaced apart from each other so as to be configured separately, and the connected state, in which their adjacent ends 20Ba and 21Ba are connected to each other so as to move together between the housing position and the upright position.

Specifically, the stand device 10 is provided with the first stand plate 20B and the second stand plate 21B separately for the chasses 14 and 15, respectively. For this reason, the stand device 10 is not affected by a circumferential difference during a pivoting action between the chasses 14 and 15 of the portable information device 12. In addition, while the stand device 10 has a simple structure in which merely the stand plates 20B and 21B are individually provided respectively for the chasses 14 and 15, the stand device 10 is able to smoothly follow a change between the stacked form and the flat-plate form of the portable information device 12, thereby achieving high convenience.

It should be noted that the present invention is not limited to the embodiments described above, but can be freely changed without departing from the gist of the present invention.

In the above, the stand device 10 has a configuration in which the stand plates 20B and 21B are rotatably connected to the cover parts 20A and 21A fixed to the chasses 14 and 15, so that the stand plates 20B and 21B are rotatably supported with respect to the chasses 14 and 15. The stand device 10, however, may not have the cover parts 20A and 21A. In this configuration, the stand device 10 may have the stand plates 20B and 21B, which are directly connected to the back faces 14c and 15c of the chasses 14 and 15 via the hinge parts 24 and 25. In this case, the chasses 14 and 15 may have a two-layer structure in the lower half of, for example, the back faces 14c and 15c in the Y direction, with the surface layer of the two-layer structure used as the stand plates 20B and 21B. Since the stand device 10 of the above embodiment has a configuration in which the stand plates 20B and 21B are concatenated to the cover parts 20A and 21A, the stand device 10 can be easily attached to the portable information device 12 and the configuration is effective from the viewpoint of decoration and protection of the portable information device 12.

In the above, the portable information device 12 that is foldable into two parts like a book has been illustrated. The portable information device 12, however, is applicable to various configurations such as, for example, a double-door configuration in which small chasses are connected in a foldable manner to the right and left edges of a large chassis, respectively, an S-shaped folded configuration in which chasses different in the folding direction are respectively connected to the right and left edges of a single chassis, a J-shaped folded configuration in which a small chassis is connected in a foldable manner to one of the right and left edges of a large chassis, and the like. Four or more chasses may be connected to each other, with respect to the number of chasses to be connected. Also in this case, the cover parts 20A and 21A and the stand plates 20B and 21B constituting the stand device 10 may be provided on the back faces of the chasses appropriately.

The invention claimed is:

1. A portable information device comprising:
a first chassis;
a second chassis adjacent to and pivotably connected to the first chassis to be pivotable relative to the first chassis; and
a stand device,
wherein:
the stand device includes:
a first stand plate on a back face of the first chassis and movable to a housing position along the back face of the first chassis and to an upright position in which the first stand plate protrudes from the back face of the first chassis; and
a second stand plate on a back face of the second chassis and movable to a housing position along the back face of the second chassis and to an upright position in which the second stand plate protrudes from the back face of the second chassis; and
the first and second stand plates are switchable between a separated state, in which the first and second stand plates are positioned separately with their adjacent ends spaced apart from each other, and a connected state, in which the adjacent ends are connected to each other to move together between the housing position and the upright position.

2. The portable information device according to claim 1, wherein:
the first chassis and the second chassis are configured to be changed into a flat-plate form, in which their respective front faces are arranged side by side in an in-plane direction, and into a stacked form in which the first chassis and the second chassis are stacked so that their front or back faces face each other; and
the stand device is placed in the connected state with the adjacent ends coming into contact with each other in the flat-plate form and is placed in the separated state with the adjacent ends spaced apart from each other in the stacked form.

3. The portable information device according to claim 2, wherein the stand device includes:
a first hinge part that supports a first end of the first stand plate to be rotatable with respect to the first chassis;
a second hinge part that supports a first end of the second stand plate to be rotatable with respect to the second chassis; and
a connecting portion that detachably connects respective adjacent ends of the first stand plate and the second stand plate to each other.

4. The portable information device according to claim 3, wherein the connecting portion includes:
a magnet on the first stand plate; and
an attracted object on the second stand plate and configured to be attracted to the magnet.

5. The portable information device according to claim 3, wherein the connecting portion includes:
a lever member pivotably supported by the first stand plate and that is away from the adjacent end of the first stand plate in the stacked form and protrudes from the adjacent end of the first stand plate in the flat-plate form; and
an engaging recessed portion on the second stand plate and with which the lever member is engageable and disengageable.

6. The portable information device according to claim 3, wherein the connecting portion includes:
a protruding portion on the first stand plate; and
a receiving portion on the second stand plate and comes into contact with the protruding portion at least when the first stand plate moves from the housing position to the upright position.

7. The portable information device according to claim 1, wherein the stand device further includes:
a first cover part covering the back face of the first chassis; and
a second cover part covering the back face of the second chassis,
wherein the first stand plate is connected to the first cover part, and
wherein the second stand plate is connected to the second cover part.

8. A stand device comprising:
a first cover part;
a second cover part adjacent to the first cover part;
a first stand plate movable between a first housing position, in which a first end of the first stand plate is rotatably connected to the first cover part via a first hinge part and is arranged side by side with the first cover part in an in-plane direction, and an upright position in which a second end of the first stand plate protrudes in an out-of-plane direction of the first cover part; and
a second stand plate movable between a second housing position, in which a first end of the second stand plate is rotatably connected to the second cover part via a second hinge part and is arranged side by side with the second cover part in an in-plane direction, and an upright position in which a second end of the second stand plate protrudes in an out-of-plane direction of the second cover part,
wherein the first stand plate and the second stand plate are switchable between a separated state, in which their respective adjacent ends are spaced apart from each other so as to be positioned separately, and a connected state, in which their adjacent ends are connected to each other to move together between the housing position and the upright position.

9. The stand device according to claim 8, further comprising a connecting portion that detachably connects the adjacent ends of the first stand plate and the second stand plate to each other.

\* \* \* \* \*